(12) United States Patent
Shi et al.

(10) Patent No.: US 8,623,181 B2
(45) Date of Patent: *Jan. 7, 2014

(54) SEAWATER DESALINIZATION DEVICE

(75) Inventors: Zheng Shi, Shenzhen (CN); Jiang-Feng Liu, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 298 days.

This patent is subject to a terminal disclaimer.

(21) Appl. No.: 12/981,524

(22) Filed: Dec. 30, 2010

(65) Prior Publication Data

US 2012/0103785 A1 May 3, 2012

(30) Foreign Application Priority Data

Oct. 27, 2010 (CN) .......................... 2010 2 0579083

(51) Int. Cl.
*B01D 3/00* (2006.01)
*C02F 1/14* (2006.01)

(52) U.S. Cl.
USPC .......... 202/234; 126/652; 126/698; 126/708; 126/712; 202/190; 202/242; 203/10; 203/100; 203/DIG. 1; 203/DIG. 17

(58) Field of Classification Search
USPC ............ 126/652, 698, 708, 712; 159/DIG. 1, 159/DIG. 15; 202/190, 234, 242, 267.1; 203/10, 86, 100, DIG. 1, DIG. 17
See application file for complete search history.

(56) References Cited

U.S. PATENT DOCUMENTS

| | | | | |
|---|---|---|---|---|
| 3,870,605 | A * | 3/1975 | Sakamoto | 202/234 |
| 4,010,080 | A * | 3/1977 | Tsay et al. | 202/83 |
| 4,687,550 | A * | 8/1987 | Wong | 202/165 |
| 6,274,004 | B1 * | 8/2001 | Andersen | 202/234 |
| 6,280,577 | B1 * | 8/2001 | Wang | 202/185.3 |
| 6,439,298 | B1 * | 8/2002 | Li | 165/104.33 |
| 6,582,563 | B1 * | 6/2003 | Adam et al. | 203/11 |
| 6,830,661 | B1 * | 12/2004 | Land | 202/83 |
| 7,927,463 | B2 * | 4/2011 | Fang | 202/163 |
| 2006/0180460 | A1 * | 8/2006 | Nagler | 202/234 |
| 2007/0245730 | A1 * | 10/2007 | Mok | 60/641.8 |
| 2010/0330639 | A1 * | 12/2010 | Lee | 435/161 |
| 2011/0120854 | A1 * | 5/2011 | Lee | 203/86 |

* cited by examiner

*Primary Examiner* — Virginia Manoharan
(74) *Attorney, Agent, or Firm* — Altis Law Group, Inc.

(57) ABSTRACT

A seawater desalinization device includes a container portion and a heat conduction cover covering on the container portion. The container portion defines a receiving chamber and a slot. The receiving chamber is configured for receiving seawater, and the slot is defined around the receiving chamber for receiving fresh water evaporated from the seawater. The heat conduction cover defines a plurality of guiding slots facing the container portion for guiding the fresh water drop into the slot.

7 Claims, 6 Drawing Sheets

SEAWATER DESALINIZATION DEVICE

CROSS-REFERENCE TO RELATED APPLICATIONS

This application is one of the three related co-pending U.S. patent applications listed below. All listed applications have the same assignee and were concurrently filed herewith. The disclosure of each of the listed applications is incorporated by reference into all the other listed applications.

| Attorney Docket No. | Title | Inventors |
| --- | --- | --- |
| US36319 | SEAWATER DESALINIZATION DEVICE | Shi et al. |
| US36320 | SEAWATER DESALINIZATION DEVICE | Shi et al. |
| US36321 | SEAWATER DESALINIZATION SYSTEM | Shi et al. |

BACKGROUND

1. Technical Field

The present disclosure generally relates to seawater desalinization devices.

2. Description of Related Art

It is well known that fresh water is the essential resources for human beings. However, with continuously worsen of environmental; the fresh water is facing pollution and becoming exhausted in the large-scale. About 70% of the earth is covered by seawater. People design seawater desalinization devices to desalinate seawater to obtain the fresh water. However, the seawater desalinization devices usually have complex structures and higher cost. Furthermore, the seawater desalinization devices usually adopt chemical method to desalinate seawater to obtain the fresh water. Therefore, the fresh water may affect healthy.

Therefore, there is room for improvement within the art.

BRIEF DESCRIPTION OF THE DRAWINGS

Many aspects of the seawater desalinization device can be better understood with reference to the following drawings. The components in the drawings are not necessarily to scale, the emphasis instead being placed upon clearly illustrating the seawater desalinization device. Moreover, in the drawings, like reference numerals designate corresponding parts throughout the several views.

DETAILED DESCRIPTION

Figure 1:
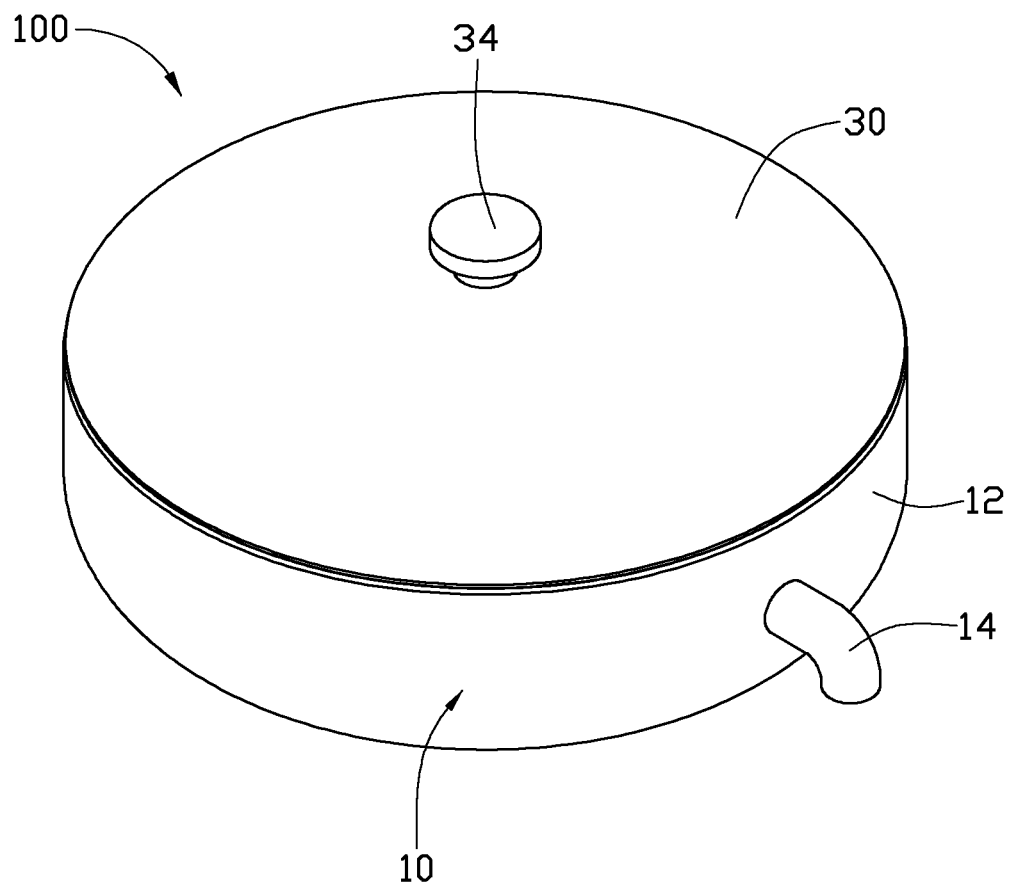
FIG. 1 is an isometric view of a seawater desalinization device, according to an exemplary embodiment.
Figure 2:
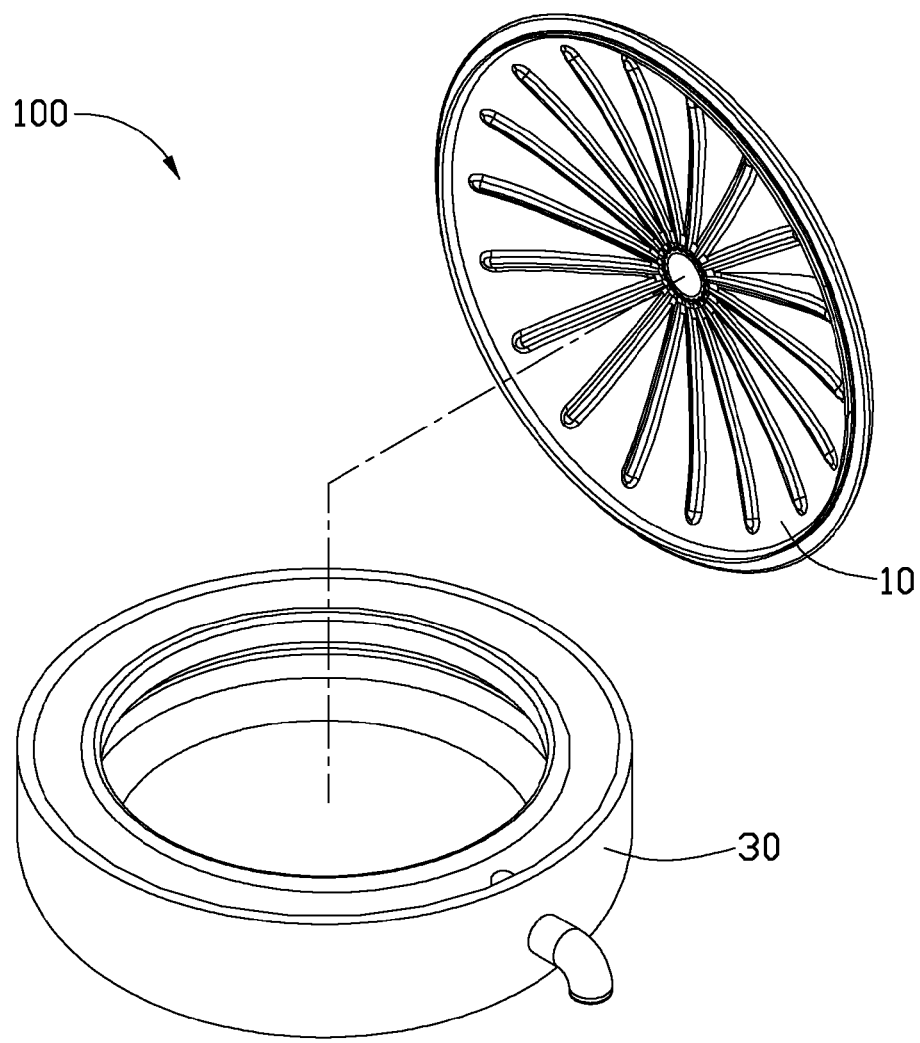
FIG. 2 is an exploded view of the seawater desalinization device shown in FIG. 1.

FIG. 1 and FIG. 2 show an exemplary embodiment seawater desalinization device 100 including a container portion 10 and a heat conduction cover 30 covering on the container portion 10.

The container portion 10 may be made of stainless steel for containing seawater. The container portion 10 includes a main body 12 and a guiding pipe 14 fixed on the main body 12.

Figure 3:
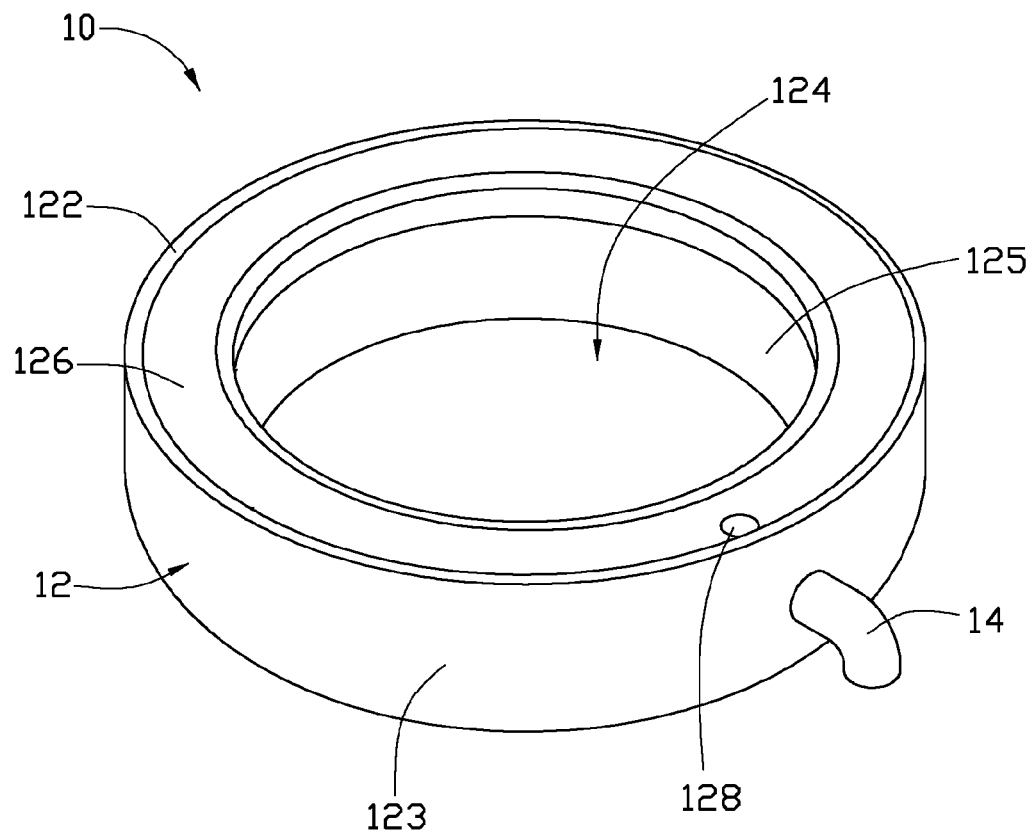
FIG. 3 is an isometric view of a container portion of the seawater desalinization device shown in FIG. 2.
Figure 4:
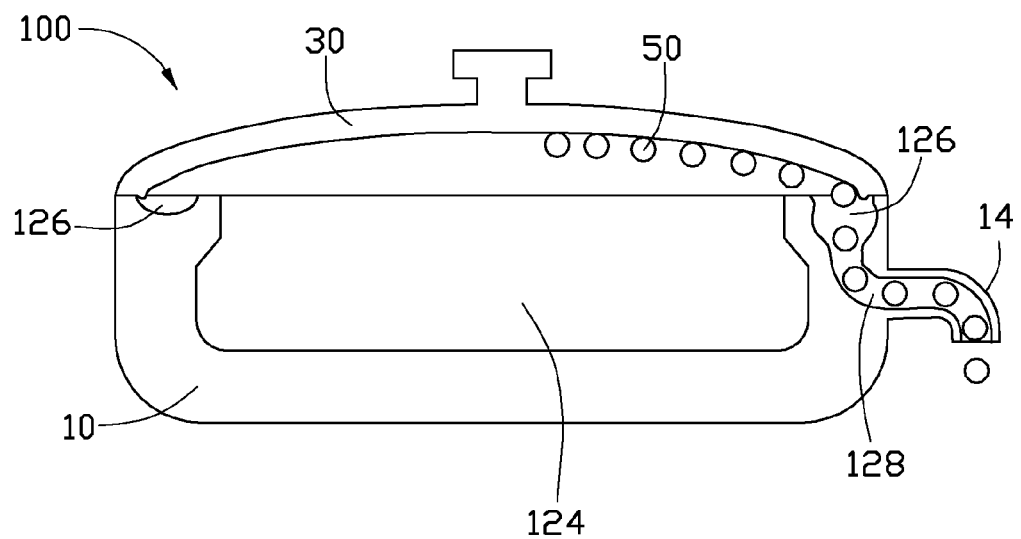
FIG. 4 is a cutaway view of the seawater desalinization device.

Referring to FIG. 3 and FIG. 4, the main body 12 includes a top portion 122 and a peripheral wall 123. The top portion 122 defines a receiving chamber 124, a ring slot 126, and a hole 128. The receiving chamber 124 is for receiving seawater. In the exemplary embodiment, an inner wall of the receiving chamber 124 is coated by a heat absorption layer 125 for absorbing solar energy to heat the seawater. The slot 126 is defined around the receiving chamber 124 for storing water. The cross-sectional view of the slot 126 is substantially semi-circular for reducing resistance to the fresh water 50 flowing into the hole 128. The hole 128 is defined in a bottom of the slot 126 for connecting the slot 126 to the guiding pipe 14. A bottom wall of the slot 126 can be an inclined plane and the hole 128 defined at the lowest portion of the slot 126. Therefore, the fresh water 50 can automatically flow into the hole 128.

The guiding pipe 14 is fixed on the peripheral wall 123 and communicates with the hole 128. Therefore, the fresh water 50 can flow out of the guiding pipe 14 through the hole 128.

Figure 5:
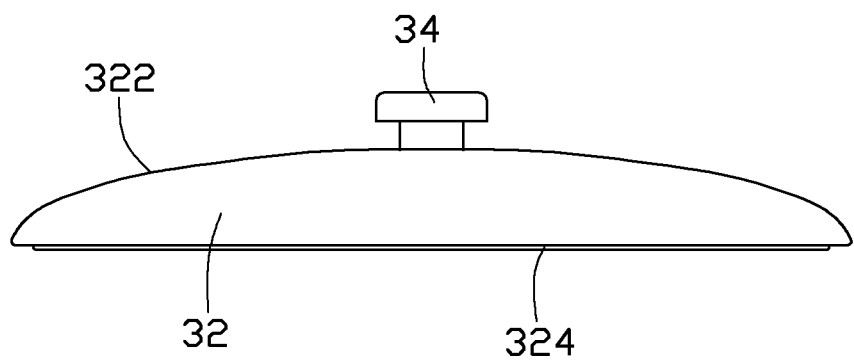
FIG. 5 is an isometric view of a heat conduction cover of the seawater desalinization device shown in FIG. 1.
Figure 6:
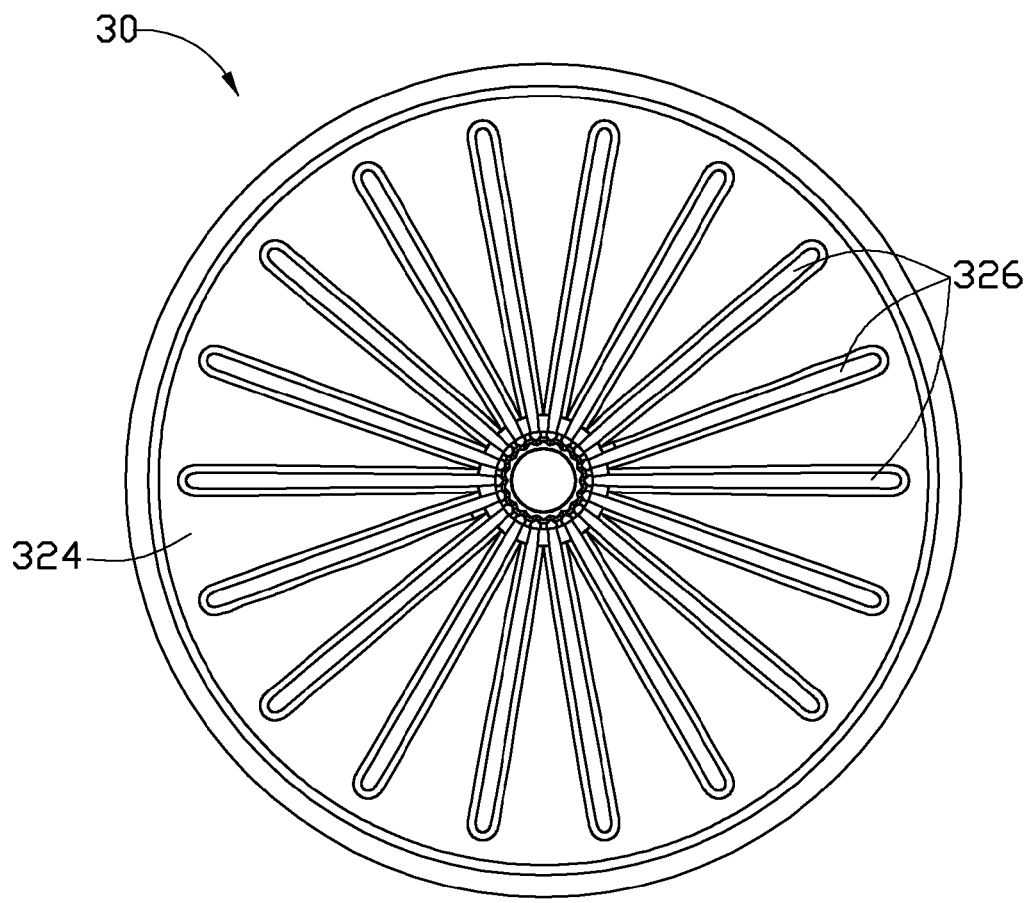
FIG. 6 is an isometric view of the heat conduction cover shown in FIG. 5, but shown in another angle.

Referring to FIG. 5 and FIG. 6, the heat conduction cover 30 includes a cover portion 32 and a handle 34 positioned on the cover portion 32. The cover portion 32 may be made of transparent toughened glass. In the exemplary embodiment, the cover portion 32 is a convex lens for focusing solar energy. The cover portion 32 includes a first surface 322 and an opposite second surface 324. The handle 34 is fixed on a center of the first surface 322. A plurality of guiding slots 326 are defined in the second surface 324. The guiding slots 326 take a position of the handle 34 as a radiation center and are defined in the second surface 324. The fresh water 50 can be stored in the guiding slots 326 and can automatically drop into the slot 126 due to gravity.

When the seawater desalinization device 100 is to be used, the seawater is filled in the container portion 10, and then the heat conduction cover 30 is positioned on the main body 12. The seawater desalinization device 100 is put in the sunlight. The sunlight shines in the seawater through the heat conduction cover 30. The heat absorption layer 125 absorbs the solar energy to increase the temperature of the seawater. Therefore, the fresh water 50 can be evaporated from the seawater. The fresh water 50 is gathered on the second surface 324 and flows along the guiding slots 326, and then the fresh water 50 drops into the slot 126. Because the hole 128 is defined at lowest portion of the slot 126, the fresh water 50 automatically flows into the hole 128 and flows out of the guiding pipe 14.

The seawater desalinization device 100 has a simple structure and it is convenient to use. In addition, the fresh water 50 is obtained by physical vapor method, thereby the fresh water 50 is safe to drink.

In another embodiment, the guiding slots 326 can be omitted, the fresh water 50 evaporated from the seawater can attach to the second surface 324 and drop into the slot 126.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A seawater desalinization device, comprising:
a container portion defining a receiving chamber for storing seawater and a slot defined around the receiving chamber, a heat absorption layer for absorbing solar energy coated on an inner wall of the receiving chamber, the container portion comprising a guiding pipe fixed on a peripheral wall thereof, the slot defining a hole communicating the slot with the guiding pipe;
a heat conduction cover covering the container portion and covering the receiving chamber and the slot, the heat conduction cover comprising a cover portion which is a convex lens for focusing solar energy and the solar energy passing through the heat conduction cover and making fresh water evaporated from the seawater to flow into the slot;
wherein a bottom wall of the slot is an inclined plane and the hole is defined at the lowest portion of the slot, the cross-sectional view of the slot is semi-circular; the heat absorption layer absorbs the solar energy to increase the temperature of the seawater, and the fresh water is evaporated from the seawater and gathered on the heat conduction cover to drop into the slot.

2. The seawater desalinization device as claimed in claim 1, wherein the heat conduction cover defines a plurality of guiding slots facing the container portion, the plurality of guiding slots guides the fresh water flow into the slot.

3. The seawater desalinization device as claimed in claim 2, wherein the plurality of guiding slots take a center of the heat conduction cover as a radiation center and are formed in the heat conduction cover.

4. The seawater desalinization device as claimed in claim 2, wherein the heat conduction cover is made of transparent toughened glass.

5. A seawater desalinization device, comprising:
a container portion defining a receiving chamber and a slot, the receiving chamber configured for receiving seawater, the slot defined around the receiving chamber for receiving fresh water evaporated from the seawater a heat absorption layer for absorbing solar energy coated on an inner wall of the receiving chamber, the container portion comprising a guiding pipe fixed on a peripheral wall thereof, the slot defining a hole connecting to the guiding pip;
a heat conduction cover covering on the container portion and covering the receiving chamber and the slot; the heat conduction cover comprising a cover portion which is a convex lens for focusing solar energy, the heat conduction cover defining a plurality of guiding slots facing the container portion for guiding the fresh water to drop into the slot;
wherein a bottom wall of the slot is an inclined plane and the hole is defined at the lowest portion of the slot, the cross-sectional view of the slot is semi-circular; the heat absorption layer absorbs the solar energy to increase the temperature of the seawater, and the fresh water is evaporated from the seawater and flows along the plurality of guiding slots to drop into the slot.

6. The seawater desalinization device as claimed in claim 5, wherein the plurality of guiding slots take a center of the heat conduction cover as a radiation center and are formed in the heat conduction cover.

7. The seawater desalinization device as claimed in claim 6, wherein the heat conduction cover is made of transparent toughened glass.

* * * * *